United States Patent
Yang (10) Patent No.: US 12,190,632 B2
(45) Date of Patent: Jan. 7, 2025

(54) METHOD, APPARATUS, DEVICE AND STORAGE MEDIUM FOR DETECTING A CARD SURFACE PICTURE

(71) Applicant: GIESECKE+DEVRIENT MOBILE SECURITY GMBH, Munich (DE)

(72) Inventor: Lei Yang, Sichuan (CN)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 461 days.

(21) Appl. No.: 17/782,305

(22) PCT Filed: Dec. 3, 2020

(86) PCT No.: PCT/CN2020/133563
§ 371 (c)(1),
(2) Date: Jun. 3, 2022

(87) PCT Pub. No.: WO2021/110090
PCT Pub. Date: Jun. 10, 2021

(65) Prior Publication Data
US 2023/0005100 A1    Jan. 5, 2023

(30) Foreign Application Priority Data
Dec. 3, 2019 (CN) .......................... 201911217656.8

(51) Int. Cl.
*G06T 3/20* (2006.01)
*G06V 10/25* (2022.01)
(Continued)

(52) U.S. Cl.
CPC ............. *G06V 40/162* (2022.01); *G06T 3/20* (2013.01); *G06V 10/25* (2022.01); *G06V 30/414* (2022.01)

(58) Field of Classification Search
CPC .... G06V 40/162; G06V 10/25; G06V 30/414; G06V 10/36; G06V 10/421;
(Continued)

(56) References Cited

U.S. PATENT DOCUMENTS

2008/0091459 A1* 4/2008 Elgar ..................... G06Q 10/06
705/300
2009/0316989 A1* 12/2009 Barbieri .................. G06T 11/00
382/173

(Continued)

FOREIGN PATENT DOCUMENTS

| CN | 105407275 A | 3/2016 |
| CN | 110674819 A | 1/2020 |

OTHER PUBLICATIONS

International Search Report from corresponding PCT Application No. PCT/CN2020/133563, Feb. 25, 2021.

*Primary Examiner* — Oneal R Mistry
*Assistant Examiner* — Jongbong Nah
(74) *Attorney, Agent, or Firm* — Workman Nydegger (57) ABSTRACT

The invention disclose a method, an apparatus, a device and a storage medium for detecting a card surface picture. The method comprises the following steps of: identifying region information of an image to be shown in a target picture; generating a picture to be detected according to the region information of the image to be shown; synthesizing the picture to be detected and a preset picture to obtain a synthesized picture; and in response to that it is detected that a fourth pixel value is contained in the synthesized picture, determining that the target picture is unqualified, which improves the efficiency of picture review and further improves the efficiency of card fabrication.

16 Claims, 4 Drawing Sheets

(51) Int. Cl.
*G06V 30/414* (2022.01)
*G06V 40/16* (2022.01)

(58) Field of Classification Search
CPC .... G06V 10/255; G06V 10/26; G06V 10/765; G06V 10/94; G06V 10/98; G06V 30/1444; G06V 30/42; G06V 40/161; G06T 3/20; G06T 11/60; G06T 3/04; G06Q 20/3558; G06F 18/24765; G06F 18/241

See application file for complete search history.

(56) References Cited

U.S. PATENT DOCUMENTS

| | | | |
|---|---|---|---|
| 2014/0334721 A1* | 11/2014 | Cervin | G06V 30/416 382/160 |
| 2015/0371219 A1* | 12/2015 | Ljujic | G06Q 40/02 358/1.18 |
| 2016/0188783 A1* | 6/2016 | Li | G06F 30/00 716/112 |
| 2016/0294820 A1* | 10/2016 | Douglas-Middleton | G06F 21/00 |
| 2019/0291341 A1* | 9/2019 | Wu | G06T 15/50 |
| 2019/0325496 A1* | 10/2019 | Schurkin | G06Q 20/3558 |

\* cited by examiner

METHOD, APPARATUS, DEVICE AND STORAGE MEDIUM FOR DETECTING A CARD SURFACE PICTURE

TECHNICAL FIELD

The invention belongs to the technical field of image recognition, and particularly relates to a method, an apparatus, a device, and a storage medium for detecting a card surface picture.

BACKGROUND

With the increasing demands of users for personalization, users can customize the card surface of smart cards according to their own selected pictures. For example, many users usually choose their favorite cartoon pictures, character pictures, animal pictures, etc. as card surface pictures of customized bank cards to meet the user's own personalized needs.

However, the card surface of the bank card not only needs the card surface picture, but also needs information of a user and a bank to which the bank card belongs. Therefore, the card surface of the bank card needs to comply with regulations of the banking institution. In order to prevent the part to be shown in the customed picture from overlapping with the user information to cause the card surface image not meeting the user's requirements, it is needed to manually review the card surface image selected by the user. However, it is inefficient to manually review smart card surface pictures.

SUMMARY

Embodiments of the present invention provide a method, an apparatus, a device, and a storage medium for detecting a card surface picture, which can solve the problem of low efficiency of manually reviewing the card surface picture of a smart card at present.

In a first aspect, a method for detecting a card surface picture is provided. The method includes: identifying region information of an image to be shown in a target picture.

A picture to be detected is generated according to the region information of the image to be shown.

The picture to be detected and a preset picture is synthesized to obtain a synthesized picture; wherein pixel values of the picture to be detected and pixel values of the preset picture are first pixel values corresponding to colorless and transparent; the picture to be detected includes a first region, the first region has the same size as a region of the image to be shown, and pixel values of the first region are second pixel values; the preset picture includes a second region, the second region has the same size as a content region in a prefabricated card, and pixel values of the second region are third pixel values; and the synthesized picture includes the first region and the second region.

It is determined that the target picture is unqualified in response to that it is detected that a fourth pixel value is contained the synthesized picture.

In a possible implementation, pixel values of a preset edge region of the preset picture are fifth pixel values; and the method further comprises: in response to that it is detected that a sixth pixel value is contained in a preset edge region of the synthesized picture, determining that the target picture is unqualified.

In a possible implementation, after a position of the first region in the picture to be detected is adjusted, a new picture to be detected is generated.

The new picture to be detected and the preset picture are synthesized to obtain a new synthesized picture.

In response to that it is detected that a fourth pixel value is contained in the new synthesized picture, it is determined that the target picture is unqualified.

In a possible implementation, the method further comprises: in response to that it is detected that a number of the adjustments of the first region reaches a preset number of the adjustments and the target picture is unqualified, generating a replacement prompt message, wherein the replacement prompt message is used to prompt a user to replace the target picture.

In a possible implementation, the generating the picture to be detected according to the region information of the image to be shown comprises: generating a first picture having the same size as the prefabricated card.

The first region is drawn on the first picture according to the region information of the image to be shown to generate the picture to be detected.

In a possible implementation, the method further comprises: identifying region information and location information of the content region on the prefabricated card.

A second picture having the same size as the prefabricated card is generated.

The second region on the second picture is drawn according to the region information and the positional information of the content region to generate the preset picture.

In a possible implementation, before identifying the region information of the image to be shown in the target picture, the method further comprises: acquiring the target picture.

In a possible implementation, the target picture comprises one or more images to be shown.

In a possible implementation, the identifying the region information of the image to be shown in the target picture comprises: identifying the image to be shown in the target picture by adopting artificial intelligence.

The region information of the image to be shown is identified.

In a possible implementation, the method further comprises: in response to that it is detected that the synthesized picture does not contain a fourth pixel value, determining that the target picture is qualified.

The qualified target picture is sent to a card fabrication data server for the card fabrication data server to fabricate a card according to the qualified target picture.

In a possible implementation, the method is applied to a server or a terminal device.

In a possible implementation, in response to that the method is applied to a terminal device, the method further comprises: in response to that the target picture is unqualified, generating adjustment prompt information, wherein the adjustment prompt information is used to prompt a user to adjust a position of the target picture.

In a possible implementation, the image to be shown is a face of a character or an animal.

In a second aspect, a method for detecting a card surface picture is provided. The method comprises: identifying region information of an image to be shown in a target picture.

A picture to be detected is generated according to the region information of the image to be shown.

The picture to be detected and a preset picture are synthesized to obtain a synthesized picture; wherein the picture to be detected includes a first region, the first region has the same size as a region of the image to be shown; the preset picture includes a second region, the second region has the same size as a content region in a prefabricated card; and the synthesized picture includes the first region and the second region.

In response to that it is detected that the first region and the second region have an overlapping region, it is determined that the target picture is unqualified; or, in response to that it is not detected that the first region and the second region have an overlapping region, it is determined that the target picture is qualified.

According to a third aspect, an apparatus for detecting a card surface picture is provided. The apparatus comprises: an identification module, configured to identify region information of an image to be shown in a target picture.

A generation module, configured to generate a picture to be detected according to the region information of the image to be shown, is included.

A synthesis module, configured to synthesize the picture to be detected and a preset picture to obtain a synthesized picture is included; wherein pixel values of the picture to be detected and pixel values of the preset picture are first pixel values corresponding to colorless and transparent; the picture to be detected includes a first region, the first region has the same size as a region of the image to be shown, and pixel values of the first region are second pixel values; the preset picture includes a second region, the second region has the same size as a content region in a prefabricated card, and pixel values of the second region are third pixel values; and the synthesized picture includes the first region and the second region.

A detection module, configured to, in response to that it is detected that a fourth pixel value is contained in the synthesized picture, determine that the target picture is unqualified, is included.

According to a fourth aspect, an apparatus for detecting a card surface picture is provided. The apparatus comprises: an identification module, configured to identify region information of an image to be shown in a target picture.

A generation module, configured to generate a picture to be detected according to the region information of the image to be shown, is included.

A synthesis module, configured to synthesize the picture to be detected and a preset picture to obtain a synthesized picture, is included; wherein the picture to be detected includes a first region, the first region has the same size as a region of the image to be shown; the preset picture includes a second region, the second region has the same size as a content region in a prefabricated card; and the synthesized picture includes the first region and the second region.

A detection module, configured to, in response to that it is detected that the first region and the second region have an overlapping region, determine that the target picture is unqualified; or, in response to that it is not detected that the first region and the second region have an overlapping region, determine that the target picture is qualified, is included.

According to a fifth aspect, an electronic device is provided. The device comprises: a processor and a memory storing computer program instructions; and in response to that executing the computer program instructions, the processor implements the method according to the first aspect or any possible implementation of the first aspect, or in response to that executing the computer program instructions, the processor implements the method according to the second aspect or any possible implementation of the second aspect.

According to a sixth aspect, there is provided a computer storage medium having stored thereon computer program instructions which, when executed by a processor, implement the method according to the first aspect or any possible implementation of the first aspect, or when executed by a processor, implement the method according to the second aspect or any possible implementation of the second aspect.

According to the method, apparatus, device and storage medium for detecting a card surface picture of the embodiments of the present invention, whether a picture uploaded by a user is qualified as a picture of a smart card is determined by automatically detecting whether a synthesized picture contains a pixel value other than pixel values of the first region, pixel values of the second region and pixel values corresponding to colorless transparency, thereby improving the efficiency of picture review and further improving the efficiency of card fabrication.

BRIEF DESCRIPTION OF THE DRAWINGS

In order to explain the technical scheme of the embodiment of the present invention more clearly, the drawings used in the embodiment of the present invention will be briefly introduced below. For ordinary technicians in the field, other drawings can be obtained according to these drawings without paying creative labor.

DETAILED DESCRIPTION

The features and exemplary embodiments of various aspects of the present invention will be described in detail below. In order to make the object, technical scheme and advantages of the present invention clearer, the present invention will be further described in detail with reference to the drawings and specific embodiments. It should be understood that the specific embodiments described herein are only configured to explain the present invention, and are not configured to limit the present invention. It will be apparent to those skilled in the art that the present invention may be practiced without some of these specific details. The following description of the embodiments is only for providing a better understanding of the present invention by illustrating examples of the present invention.

It should be noted that in this document, relational terms such as "first" and "second" are only used to distinguish one entity or operation from another entity or operation, and do not necessarily require or imply any such actual relationship or order between these entities or operations. Furthermore, the terms "including", "comprising" or any other variation thereof are intended to cover non-exclusive inclusion, so that a process, method, article or device including a series of elements includes not only those elements, but also other elements not explicitly listed, or elements inherent to such process, method, article or device. Without further restrictions, the elements defined by the sentence "including . . . " do not exclude the existence of other identical elements in the process, method, article or device including the elements.

At present, personalized pictures provided by users can be used as card surface pictures of smart cards. For example, the smart cards may be bank cards, membership cards, subway cards, or the like.

Take a bank card as an example. In addition to the card surface picture, the bank card also contains necessary contents such as a chip, bank emblem, bank card account number, user name, bank card validity period, and an institution to which the bank card belongs. However, a position of the necessary contents of the bank card in the card surface needs to meet certain regulations or meet the requirements of the bank card institutions. Images in personalized pictures submitted by users, for example, the personalized pictures include a bird, which the user needs to display on the bank card. However, some necessary contents of the bank card may block the images that users want to display. Therefore, the images that users want to display need to be in a certain positional relationship with the necessary contents of the bank card. For example, if the user wants to take a character picture as the card surface picture of the bank card, the face region of the figure picture cannot be blocked by the necessary contents of the bank card when fabricating the bank card. If this appears, it will affect the beauty of the bank card and reduce the user experience.

In order to ensure that the card surface of the bank card meets the relevant requirements and meets the personalized needs of users, it is needed to manually review the card surface picture selected by the user. However, it is inefficient to manually review the card surface picture of the smart card.

Therefore, embodiments of the present invention provide a method, an apparatus, a device, and a storage medium for detecting a card surface picture. In the method for detecting a card surface picture, a user can upload a customized picture to a server through a terminal device, and the customized picture may be a character picture, a cartoon picture, a plant picture, or an art word picture. After receiving the customized picture uploaded by the user, the server detects the conformity of the customized picture uploaded by the user by using the method for detecting a card surface picture. In response to that the customized picture is unqualified, the server feeds back a detection result to the terminal device, and the user re-uploads a new customized picture based on the detection result received by the terminal device. For example, the size and shape of a previously uploaded customized picture can be modified and the like. In response to that the customized picture is qualified, the customized picture can be used as the card surface picture of the smart card and the review is passed. The server sends the customized picture to a card fabrication data server, and the card fabrication data server makes a smart card based on the customized picture.

Users can also upload a customized picture to the terminal device, and the terminal device detects the conformity of the customized picture uploaded by the user by using the method for detecting a card surface picture. In response to that the customized picture is unqualified, the terminal device can generate prompt information to prompt the user that the customized picture is unqualified, and the user can adjust a position of the image to be shown in the customized picture or replace the customized picture. In response to that the customized picture is qualified, the terminal device can send the customized picture and user information to the server. The server can check whether there is any illegal information in the user information, for example, whether the ID number of the user is a forged ID number, whether the user commits illegal acts, etc. After the user information is approved, the server sends the customized picture to a card fabrication data server. The terminal device can also directly send the customized picture to the card fabrication data server after the customized picture is detected to be qualified by the method for detecting a card surface picture. The card fabrication data server makes a smart card according to the customized picture.

The following firstly describes a method for detecting a card surface picture provided by an embodiment of the present invention.

Figure 1:
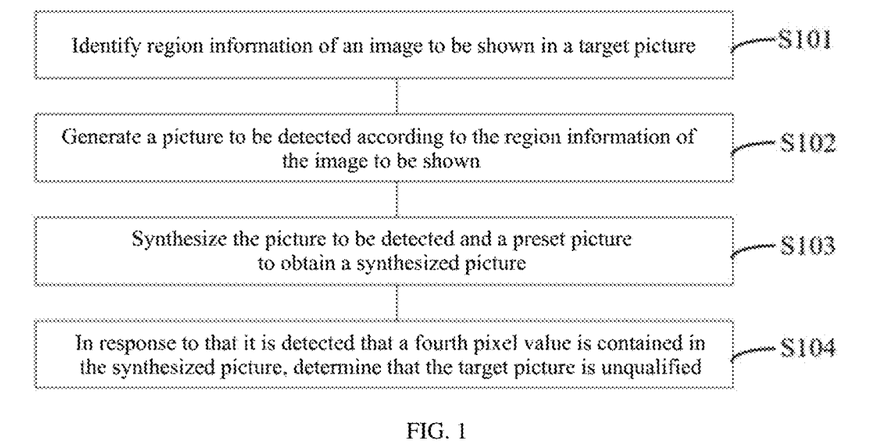
FIG. 1 is a schematic flowchart of a method for detecting a card surface picture provided by an embodiment of the present invention.

FIG. 1 shows a schematic flow chart of a method for detecting a card surface provided by an embodiment of the present invention. As shown in FIG. 1, the method for detecting a card surface picture includes: S101: identifying region information of an image to be shown in a target picture.

In an embodiment of the present invention, the target picture is a user-customized picture, which can be used as a card surface picture of a prefabricated card, wherein the target picture can be a character picture, a cartoon picture, a plant picture, or a word art picture. The image to be shown may be a character head in a character picture, an animal head in an animal picture, a cartoon image in a cartoon picture, a plant image in a plant picture, a word of art in a word art picture, and the like. The region information may be a size of the region and a shape of the region of the image to be shown. The target picture may include at least one image to be shown. For example, the target picture may be a family photo, and there are 5 people in the family photo, so the head region of these 5 people are all images to be shown. The prefabricated cards may be bank cards and subway cards customized by users.

Before identifying the target picture, it is firstly needed to obtain the target picture uploaded by the user. After obtaining the target picture, it is needed to identify the image to be shown in the target picture and determine the region information of the image to be shown. In an embodiment, artificial intelligence can be used to identify the image to be shown. For example, if the image to be shown in the target picture is a face image, then face recognition can be used to identify the image to be shown.

At S102, a picture to be detected is generated according to the region information of the image to be shown.

Figure 2:
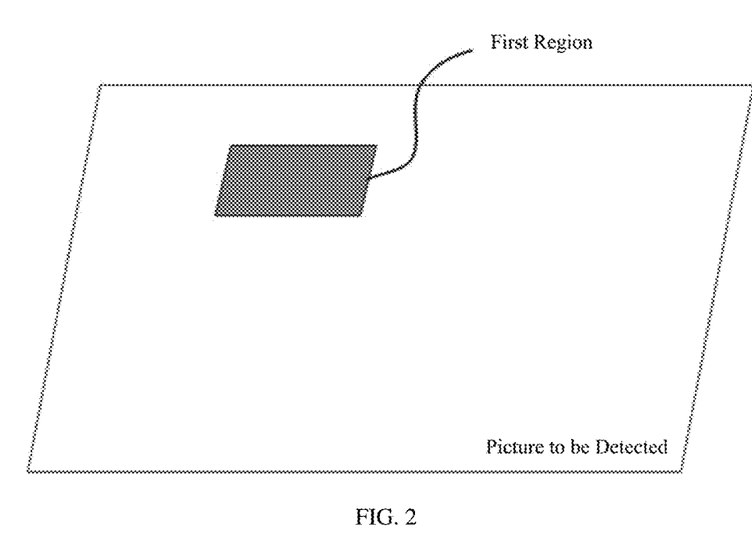
FIG. 2 is a schematic diagram of a picture to be detected provided by an embodiment of the present invention.

A specific process of generating the picture to be detected may as follows: generating a first picture having the same size as the prefabricated card, and the first picture may be transparent, that is, pixel values of the first picture may be first pixel values corresponding to colorless and transparent. After obtaining the first picture, drawing the first region on the first picture according to the identified region information of the image to be shown. The first region is a region corresponding to the image to be shown, including a size and a shape of the region corresponding to the image to be shown. The shape of the first region may be rectangular, circular, or an outline shape of the image to be shown. After drawing the first region on the first picture, a picture to be detected is obtained, as shown in FIG. 2. Herein, a region of the picture to be detected other than the first region may also be transparent. The first region may be filled with a color, such as yellow. The pixel values of the region filled with the color are pixel values corresponding to yellow, i.e., second pixel values.

At S103, the picture to be detected and a preset picture are synthesized to obtain a synthesized picture, wherein the synthesized picture includes the first region and a second region.

After generating the picture to be detected, the synthesized picture needs to be generated based on the picture to be detected and the preset picture. Before generating the synthesized picture, an embodiment of the present invention further provides a method for specifically generating the preset picture, specifically including: identifying region information and location information of a content region on a prefabricated card; generating a second picture having the same size as the prefabricated card; and drawing the second region on the second picture to generate a preset picture according to the region information and the positional information of the content region.

In an embodiment of the present invention, taking a bank card as an example, the bank card includes a chip, and may also include necessary contents such as bank emblem, bank card account number, user name, bank card validity period, and institution to which the bank card belongs. Each necessary content occupies a certain region on the bank card, which may be expressed as a rectangular box. That is, the rectangular frame is the content region.

The region information and the location information of the content region on the prefabricated card are identified. Here, an arrangement of the content region on the prefabricated card may be arranged according to relevant regulations. The necessary contents in the content region may include user-customized content.

Figure 3:
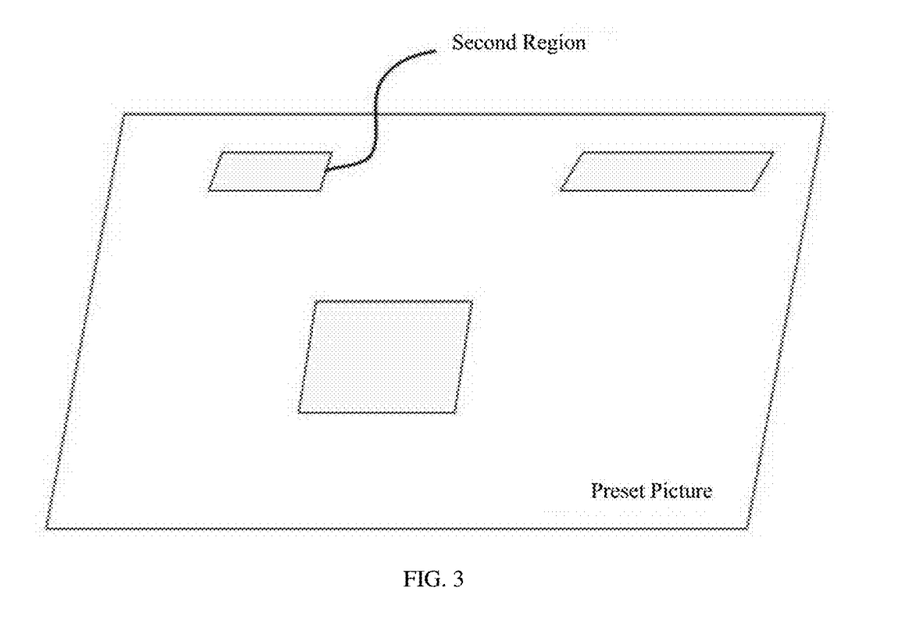
FIG. 3 is a schematic diagram of a preset picture provided by an embodiment of the present invention.

Generating the second picture having the same size as the prefabricated card. The second picture may be transparent, that is, a pixel value of the second picture is a first pixel value corresponding to colorless and transparent. After obtaining the second picture, drawing a second region on the second picture according to the region information and positional information of the identified content region to obtain a preset picture, as shown in FIG. 3. Wherein, a size and a shape of the second region and the content region are the same, and a position of the content region on the prefabricated card is the same as a position of the second region in the second picture.

The preset picture also includes the second region, and the second region may be filled with a color, for example, filled with blue. Pixel values of the filled region are pixel values corresponding to blue, that is, third pixel values. A region of the preset picture other than the second region may be transparent.

It may be understood that the color filled in the first region is different from the color filled in the second region.

Figure 4:
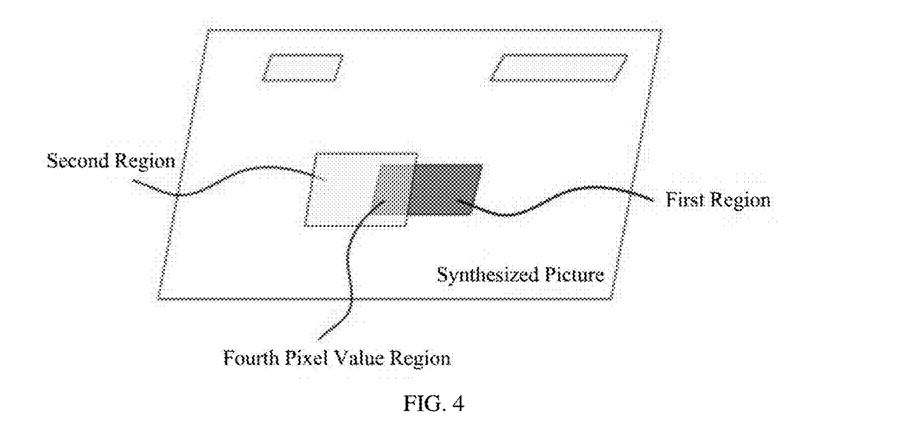
FIG. 4 is a schematic diagram of a synthesized picture provided by an embodiment of the present invention.

In an embodiment of the present invention, the synthesized picture may be generated by superimposing the picture to be detected and the preset picture, as shown in FIG. 4. The synthesized picture includes the first region and the second region. The first region and the second region in the synthesized picture may overlap with each other. If the first region and the second region in the synthesized picture overlap with each other, the necessary contents corresponding to the second region block the image to be shown corresponding to the first region, that is to say, the target picture is unqualified. For example, if the first region is yellow and the second region is blue, the overlapped region is green. Then, if the second region blocks the first region, a pixel value corresponding to green will be detected. A region of the synthesized picture other than the first region and the second region may be transparent.

At S104, in response to that it is detected that a fourth pixel value is contained in the synthesized picture, it is determined that the target picture is unqualified.

It is detected whether a fourth pixel is synthesized in the synthesized picture. The region of the synthesized picture other than the first region and the second region is transparent. For example, the first region is yellow and the second region is blue. If the first region and the second region do not overlap, only yellow and blue are contained in the synthesized picture. If the first region and the second region have an overlapping part, the superimposed color of yellow and blue is green. If a pixel value corresponding to green is detected, the target picture is unqualified. At this time, a detection result may be fed back to a user, so that the user provides a qualified target picture, and prevents the image to be shown from being blocked by the necessary contents, thereby improving the user experience. If no pixel value corresponding to green is detected, the target picture is qualified. The embodiment of the present invention determines the conformity of the target picture by detecting pixel values corresponding to different colors in the synthesized picture, so that the error rate can be low, and the review speed of the picture can be improved.

In addition, in order to make the image to be shown be completely synthesized in the synthesized picture, that is to say, the image to be shown may be completely displayed on the card surface of the prefabricated card after the prefabricated card is completed, thereby improving the user experience, it is needed to detect whether the image to be shown is completely synthesized in the synthesized picture.

Specifically, pixel values of a preset edge region of the preset picture are fifth pixel values; the method further includes: in response to that it is detected that a preset edge region of the synthesized picture includes a sixth pixel value, determining that the target picture is unqualified.

In an embodiment of the present invention, for example, the preset edge region of the preset picture may be filled with red, where the preset edge region is a region within each edge of the preset picture. The region of the preset edge region is small. For another example, if a region to be detected is yellow, and if orange is detected in the synthesized picture, the first region overlaps with the preset edge region, so the first region corresponding to the image to be shown may not be completely synthesized on the synthesized picture, that is to say, the target picture is unqualified.

The preset edge region may also be blue. If the first region overlaps with the preset edge region, the overlapping region is green.

The unqualified target picture may be due to an incorrect placement of the image to be shown in the picture to be detected. A position of the first region in the picture to be detected may be adjusted. Of course, the picture position may also be adjusted for other reasons, so as to adjust the position of the first region in the picture to be detected, and then the preset picture and the picture to be detected are synthesized again to obtain a new synthesized picture. A pixel value of the new synthesized picture is detected.

In response to that it is detected that a number of the adjustments of the first region have reached a preset number of the adjustments and the target picture is still unqualified, replacement prompt information is generated to prompt the user to replace the target picture. Then, according to the method for detecting a card surface picture of S101-S104 shown in FIG. 1, the conformity of the replaced target picture can be detected.

In addition, the method for detecting a card surface picture shown in FIG. 1 may also be applied to a terminal device, where the terminal device may detect the conformity of the target picture in real time. After the terminal device receives the target picture uploaded by a user, the terminal device may display a location of the target picture to the user in real time through an application or a web page. The user may also intuitively understand the adjustment method of the target picture and then adjust the picture. For example, the application of the terminal device is provided with a display region in the same size as the prefabricated card. The display region may also include the content region of the prefabricated card. The display region may display a relative position between the image to be shown in the target picture and the content region when the card is made. Meanwhile, the terminal device also detects the conformity of the target picture by adopting the method for detecting a card surface picture of S101-S104 shown in FIG. 1. In response to that it is detected that the target picture is unqualified, an adjustment prompt message is generated, which is used to prompt the user to adjust the position of the target picture and the way in which the user adjusts the target picture. For example, the adjustment prompt message may be to adjust the target picture to the left by about 2 cm.

According to the method for detecting a card surface picture provided by the embodiment of the invention, the region of the image to be shown in the target picture and the content region in the prefabricated card are synthesized on the synthesized picture. And the pixel value of the synthesized picture is detected. By detecting the pixel value of the synthesized picture, the conformity of the target picture may be determined, which improves the efficiency of picture review and accelerates the efficiency of card fabrication.

Figure 5:
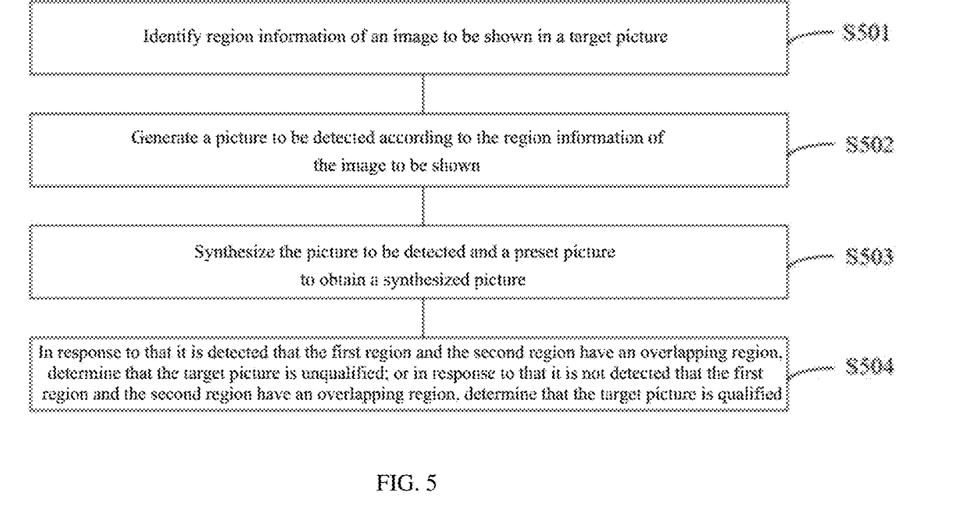
FIG. 5 is a schematic flowchart of a method for detecting a card surface picture provided by another embodiment of the present invention.

FIG. 5 shows a schematic flow chart of another method for detecting a card surface picture provided by an embodiment of the present invention. As shown in FIG. 5, the method for detecting a card surface picture includes: at S501, identifying region information of an image to be shown in a target picture.

In an embodiment of the present invention, the target picture is a user-customized picture, which may be used as a card surface picture of a prefabricated card, wherein the target picture may be a character picture, a cartoon picture, a plant picture, or a word art picture. The image to be shown may be a face image in a character picture, a cartoon image in a cartoon picture, a plant image in a plant picture, a word of art in a word art picture, and the like. The region information may be a size of the region and a shape of the region of the image to be shown. The prefabricated cards are cards that users want to customize, including bank cards, subway cards, etc.

Before identifying the target picture, it is firstly needed to obtain the target picture uploaded by the user. After obtaining the target picture, it is needed to identify the image to be shown in the target picture and determine the region information of the image to be shown. In an embodiment, artificial intelligence may be used to identify the image to be shown. For example, if the image to be shown in the target picture is a face image, then the face recognition may be used to identify the image to be shown.

At S502, a picture to be detected is generated according to the region information of the image to be shown.

At S503, the picture to be detected and a preset picture are synthesized to obtain a synthesized picture; wherein the picture to be detected includes a first region, the first region has the same size as a region of the image to be shown; the preset picture includes a second region, the second region has the same size as a content region in a prefabricated card; and the synthesized picture includes the first region and the second region.

In an embodiment of the present invention, the picture to be detected is generated based on the region information of the image to be shown. The picture to be detected includes a first region, and the preset picture includes a second region. After the picture to be detected and the preset picture are synthesized, the obtained synthesized picture includes a first region and a second region. The conformity of the target picture is determined by detecting whether the first region and the second region in the synthesized picture have an overlapping region.

Embodiments such as a manner of generating a picture to be detected based on region information of an image to be shown and a manner of generating a preset picture are consistent with the embodiment shown in FIG. 1, and details are not described herein again.

At S504, in response to that it is detected that the first region and the second region have an overlapping region, it is determined that the target picture is unqualified; or in response to that it is not detected that the first region and the second region have an overlapping region, it is determined that the target picture is qualified.

In an embodiment of the present invention, if there is no overlapping region between the first region and the second region, the content region in the prefabricated card does not block the image to be shown. Therefore, if it is detected that the first region and the second region in the synthesized picture have an overlapping region, the target picture is unqualified. If it is not detected that the first region and the second region have an overlapping region, the target picture is qualified.

The method for detecting a card surface picture provided by the embodiment of the present invention has a simple method for detecting the conformity of a target picture, which improves the efficiency of picture review, and further accelerates the efficiency of card fabrication.

Figure 6:
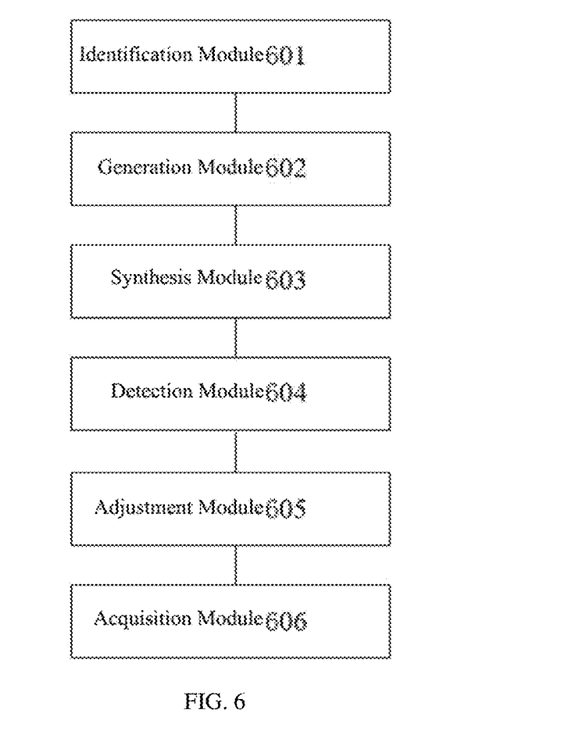
FIG. 6 is a schematic structural diagram of an apparatus for detecting a card surface picture provided by an embodiment of the present invention.

FIG. 6 shows a schematic structural diagram of an apparatus for detecting a card surface picture according to an embodiment of the present invention. As shown in FIG. 6, the apparatus for detecting a card surface picture includes: an identification module 601, which is configured to identify region information of an image to be shown in a target picture.

A generation module 602 is configured to generate a picture to be detected according to the region information of the image to be shown.

A synthesis module 603 is configured to synthesize the picture to be detected and a preset picture to obtain a synthesized picture; wherein pixel values of the picture to be detected and pixel values of the preset picture are first pixel values corresponding to colorless and transparent; the picture to be detected includes a first region, the first region has the same size as a region of the image to be shown, and pixel values of the first region are second pixel values; the preset picture includes a second region, the second region has the same size as a content region in a prefabricated card, and pixel values of the second region are third pixel values; and the synthesized picture includes the first region and the second region.

A detection module 604 is configured to, in response to that it is detected that a fourth pixel value is contained in the synthesized picture, determine that the target picture is unqualified.

Optionally, pixel values of a preset edge region of the preset picture are fifth pixel values; and the detection module 604 is further configured to, in response to that it is detected that a sixth pixel value is contained in the preset edge region of the synthesized picture, determine that the target picture is unqualified.

Optionally, the apparatus for detecting a card surface picture further includes an adjustment module 605, which is configured to, in response to that the target picture is unqualified, adjust a position of the first region in the picture to be detected to generate a new picture to be detected.

The synthesis module 603 is further configured to synthesize the new picture to be detected and the preset picture to obtain a new synthesized picture.

The detection module 604 is further configured to, in response to that it is detected that a fourth pixel value is contained in the new synthesized picture, determine that the target picture is unqualified.

Optionally, in response to that it is detected that a number of the adjustments of the first region reaches a preset number of the adjustments and the target picture is unqualified, the generation module 602 is further configured to generate replacement prompt information, and the replacement prompt information is used to prompt the user to replace the target picture.

Optionally, the generation module 602 is specifically configured to: generate a first picture having the same size as the prefabricated card.

According to the region information of the image to be shown, the first region is drawn on the first picture to generate the picture to be detected.

Optionally, the identification module 601 is further configured to identify region information and location information of a content region on a prefabricated card.

The generation module 602 is further configured to generate a second picture having the same size as the prefabricated card.

The generation module 602 is further configured to draw a second region on the second picture according to the region information and the positional information of the content region to generate a preset picture.

Optionally, the apparatus for detecting a card surface picture further includes an acquisition module 606, which is configured to, before identifying the region information of the image to be shown in the target picture, obtain the target picture.

Optionally, the target picture includes one or more images to be shown.

Optionally, the identification module 601 is specifically configured to identify the image to be shown in the target picture by adopting artificial intelligence.

The identification module 601 is further specifically configured to identify the region information of the image to be shown.

Optionally, the detection module 604 is further configured to, in response to that it is detected that the synthesized picture does not contain the fourth pixel value, determine that the target picture is qualified; and send the target picture to the card fabrication data server for the card fabrication data server to fabricate the prefabricated card according to the target picture.

Optionally, the apparatus is applied to a server or a terminal device.

Optionally, in response to that the apparatus is applied to the terminal device, and in response to that the target picture is unqualified, the generation module 602 is further configured to generate adjustment prompt information, and the adjustment prompt information is used to prompt a user to adjust a position of the target picture.

Optionally, the image to be shown is a face of a character or an animal.

The apparatus for detecting a card surface picture provided by the embodiment of the present invention executes each step in the method shown in FIG. 1, and may achieve technical effects of improving the efficiency of picture review and further accelerating the efficiency of card fabrication. For the sake of concise description, it will not be repeated in detail here.

Figure 7:
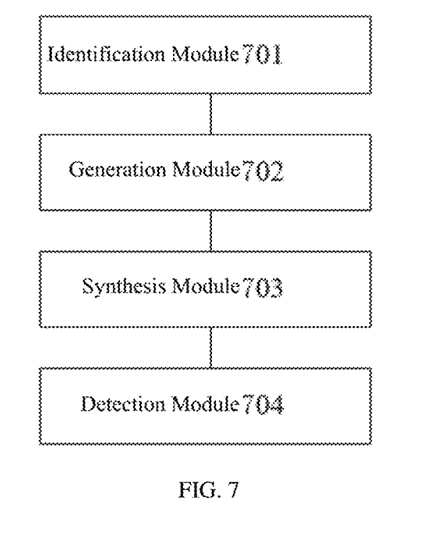
FIG. 7 is a schematic structural diagram of an apparatus for detecting a card surface picture provided by another embodiment of the present invention.

FIG. 7 shows a schematic structural diagram of another apparatus for detecting a card surface picture provided by an embodiment of the present invention. As shown in FIG. 7, the apparatus for detecting a card surface picture includes: an identification module 701 configured to identify region information of an image to be shown in a target picture; a generation module 702, configured to generate a picture to be detected according to the region information of the image to be shown; a synthesis module 703, configured to synthesize the picture to be detected and a preset picture to obtain a synthesized picture; wherein the picture to be detected includes a first region, the first region has the same size as a region of the image to be shown; the preset picture includes a second region, the second region has the same size as a content region in a prefabricated card; and the synthesized picture includes the first region and the second region; and a detection module 704, configured to, in response to that it is detected that the first region and the second region have an overlapping region, determine that the target picture is unqualified; or, in response to that it is not detected that the first region and the second region have an overlapping region, determine that the target picture is qualified.

The apparatus for detecting a card surface picture provided by the embodiment of the present invention executes each step in the method shown in FIG. 5, and may achieve technical effects of detecting the conformity of the target picture in a simple manner, improving the efficiency of picture review and thereby speeding up the efficiency of card fabrication. For the sake of concise description, it is not repeated in detail here.

Figure 8:
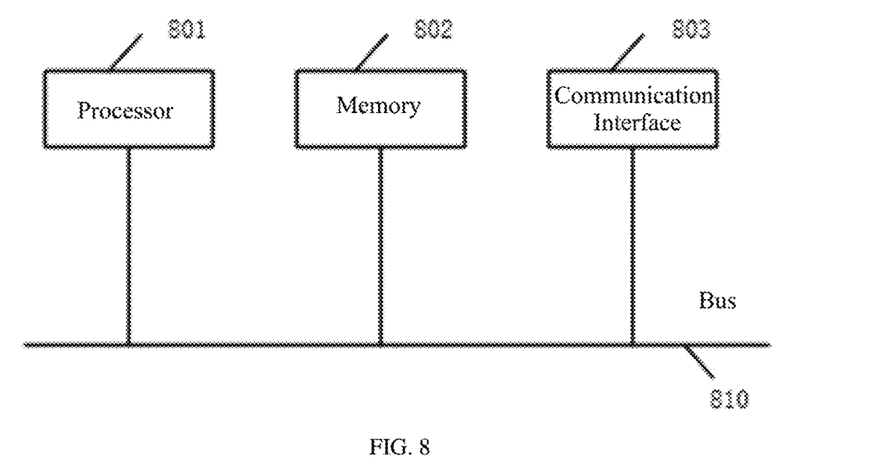
FIG. 8 is a schematic structural diagram of an electronic device provided by an embodiment of the present invention.

FIG. 8 shows a schematic diagram of a hardware structure of an electronic device provided by the present embodiment.

The electronic device may include a processor 801 and a memory 802 storing computer program instructions.

Specifically, the foregoing processor 801 may include a central processing unit (CPU), or an application specific integrated circuit (ASIC), or may be configured as one or more integrated circuits for implementing embodiments of the present invention.

The memory 802 may include a mass storage for data or instructions. By way of example and not limitation, the memory 802 may include a hard disk drive (HDD), floppy disk drive, flash memory, optical disk, magnetic disk, tape, or Universal Serial Bus (USB) drive, or a combination of two or more of these. In suitable cases, the memory 802 may include removable or non-removable (or fixed) media. In suitable cases, the memory 802 may be internal or external to the integrated gateway disaster recovery device. In certain embodiments, the memory 802 is a non-volatile solid state memory. In certain embodiments, the memory 802 includes a read-only memory (ROM). In suitable cases, the ROM may be mask-programmed ROM, programmable ROM (PROM), erasable PROM (EPROM), electrically erasable PROM (EEPROM), electrically rewritable ROM (EAROM), or flash memory, or a combination of two or more of these.

The processor 801 implements any of the method for detecting a card surface picture of the above embodiment by reading and executing the computer program instructions stored in the memory 802.

In an example, the electronic device may further include a communication interface 803 and a bus 810. Among them, as shown in FIG. 8, the processor 801, the memory 802, and the communication interface 803 are connected through the bus 810 and complete communication with each other.

The communication interface 803 is mainly used to implement communication between various modules, apparatuses, units, and/or devices in the embodiments of the present invention.

The bus 810 includes hardware, software, or both, that couples components of an electronic device to each other. By way of example, rather than limitation, the bus may include an accelerated graphics port (AGP) or other graphics bus, an enhanced industry standard architecture (EISA) bus, a front-side bus (FSB), a hyper-transport (HT) interconnect, an industry standard architecture (ISA) bus, an unlimited bandwidth interconnect, a low pin count (LPC) bus, a memory bus, a micro channel architecture (MCA) bus, a peripheral component interconnect (PCI) bus, PCI-Express (PCI-X) bus, Serial Advanced Technology Attachment (SATA) bus, Video Electronics Standards Board Local (VLB) bus, or other suitable bus, or a combination of two or more of these. In suitable cases, bus 810 may include one or more busses. Although specific buses are described and illustrated in this embodiment, any suitable bus or interconnection can be contemplated in the present invention.

The electronic device may execute the method for detecting a card surface picture in the embodiment of the present invention, thereby implementing the method for detecting a card surface picture described in conjunction with FIG. 1 and FIG. 5.

In addition, in conjunction with the method for detecting a card surface picture in the foregoing embodiment, embodiments of the present invention may be implemented by providing a computer storage medium. The computer storage medium stores computer program instructions; when the computer program instructions are executed by a processor, the method for detecting a card surface picture in any of the foregoing embodiments is implemented.

It should be clear that the invention is not limited to the specific configurations and processes described above and shown in the figures. For brevity, detailed descriptions of known methods are omitted here. In the above embodiments, several specific steps have been described and shown as examples. However, the method of the present invention is not limited to the specific steps described and shown, and those skilled in the art may make various changes, modifications and additions, or change the order between the steps after understanding the spirit of the present invention.

The functional blocks shown in the structural block diagram described above may be implemented as hardware, software, firmware, or a combination thereof. When implemented in hardware, it may be, for example, an electronic circuit, an application specific integrated circuit (ASIC), appropriate firmware, a plug-in, a function card, and the like. When implemented in software, the elements of the invention are programs or code segments that are used to perform the required tasks. The program or code segment may be stored in a machine-readable medium, or transmitted on a transmission medium or a communication link through a data signal carried on a carrier wave. A "machine-readable medium" may include any medium capable of storing or transmitting information. Examples of machine-readable media include electronic circuits, semiconductor memory devices, ROM, flash memory, erasable ROM (EROM), floppy disks, CD-ROMs, optical disks, hard disks, fiber optic media, radio frequency (RF) links, and the like. The code segments may be downloaded via a computer network such as the Internet, an intranet, and the like.

It should also be noted that the exemplary embodiments mentioned in the present invention describe some methods or systems based on a series of steps or apparatuses. However, the present invention is not limited to the order of the above steps, that is, the steps may be performed in the order mentioned in the embodiment, may be different from the order in the embodiment, or several steps may be performed simultaneously.

The foregoing is only a specific implementation of the present invention, and it may be clearly understood by those skilled in the art that for the convenience and conciseness of description, the specific working processes of the systems, modules and units described above may refer to the corresponding processes in the aforementioned method embodiments, and will not be repeated in detail here. It should be understood that the protection scope of the present invention is not limited to this, and any person familiar with the technical field may easily think of various equivalent modifications or substitutions within the technical scope disclosed by the present invention, which should be included within the protection scope of the present invention.

The invention claimed is:

1. A method for detecting a card surface picture, wherein the method comprises:
   identifying region information of an image to be shown in a target picture;
   generating a picture to be detected according to the region information of the image to be shown;
   synthesizing the picture to be detected and a preset picture to obtain a synthesized picture;
   wherein pixel values of the picture to be detected and pixel values of the preset picture are first pixel values corresponding to colorless and transparent;
   the picture to be detected includes a first region, the first region has the same size as a region of the image to be shown, and pixel values of the first region are second pixel values;
   the preset picture includes a second region, the second region has the same size as a content region in a prefabricated card, and pixel values of the second region are third pixel values; and the synthesized picture includes the first region and the second region; and
   in response to that it is detected that a fourth pixel value is contained in the synthesized picture, determining that the target picture is unqualified.

2. The method according to claim 1, wherein pixel values of a preset edge region of the preset picture are fifth pixel values; and the method further comprises:

in response to that it is detected that a sixth pixel value is contained in the preset edge region of the synthesized picture, determining that the target picture is unqualified.

3. The method according to claim 1, wherein:
after a position of the first region in the picture to be detected is adjusted, generating a new picture to be detected;
synthesizing the new picture to be detected and the preset picture to obtain a new synthesized picture; and
in response to that it is detected that a fourth pixel value is contained in the new synthesized picture, determining that the target picture is unqualified.

4. The method according to claim 3, wherein the method further comprises:
in response to that it is detected that a number of the adjustments of the first region reaches a preset number of the adjustments and the target picture is unqualified, generating a replacement prompt message,
wherein the replacement prompt message is used to prompt a user to replace the target picture.

5. The method according to claim 1, wherein the generating the picture to be detected according to the region information of the image to be shown comprises:
generating a first picture having the same size as the prefabricated card; and
drawing the first region on the first picture according to the region information of the image to be shown to generate the picture to be detected.

6. The method according to claim 1, wherein the method further comprises:
identifying region information and location information of the content region on the prefabricated card;
generating a second picture having the same size as the prefabricated card; and
drawing the second region on the second picture according to the region information and the positional information of the content region to generate the preset picture.

7. The method according to claim 1, wherein before identifying the region information of the image to be shown in the target picture, the method further comprises:
acquiring the target picture.

8. The method according to claim 1, wherein the target picture comprises one or more images to be shown.

9. The method according to claim 1, wherein the identifying the region information of the image to be shown in the target picture comprises:
identifying the image to be shown in the target picture by adopting artificial intelligence; and
identifying the region information of the image to be shown.

10. The method according to claim 1, wherein the method further comprises:
in response to that it is detected that the synthesized picture does not contain a fourth pixel value, determining that the target picture is qualified; and
sending the qualified target picture to a card fabrication data server for the card fabrication data server to fabricate a card according to the qualified target picture.

11. The method according to claim 1, wherein the method is applied to a server or a terminal device.

12. The method according to claim 11, wherein in a case that the method is applied to the terminal device, the method further comprises:
in response to that the target picture is unqualified, generating adjustment prompt information,
wherein the adjustment prompt information is used to prompt a user to adjust a position of the target picture.

13. The method according to claim 1, wherein the image to be shown is a face of a character or an animal.

14. The method according to claim 1, wherein:
in response to that it is detected that the first region and the second region have an overlapping region, determining that the target picture is unqualified; or,
in response to that it is not detected that the first region and the second region have an overlapping region, determining that the target picture is qualified.

15. An apparatus for detecting a card surface picture, wherein the apparatus comprises:
an identification module, configured to identify region information of an image to be shown in a target picture;
a generation module, configured to generate a picture to be detected according to the region information of the image to be shown;
a synthesis module, configured to synthesize the picture to be detected and a preset picture to obtain a synthesized picture;
wherein pixel values of the picture to be detected and pixel values of the preset picture are first pixel values corresponding to colorless and transparent;
the picture to be detected includes a first region, the first region has the same size as a region of the image to be shown, and pixel values of the first region are second pixel values;
the preset picture includes a second region, the second region has the same size as a content region in a prefabricated card, and pixel values of the second region are third pixel values; and
the synthesized picture includes the first region and the second region; and
a detection module, configured to, in response to that it is detected that a fourth pixel value is contained in the synthesized picture, determine that the target picture is unqualified.

16. An apparatus for detecting a card surface picture, wherein the apparatus comprises:
an identification module, configured to identify region information of an image to be shown in a target picture;
a generation module, configured to generate a picture to be detected according to the region information of the image to be shown;
a synthesis module, configured to synthesize the picture to be detected and a preset picture to obtain a synthesized picture;
wherein the picture to be detected includes a first region, the first region has the same size as a region of the image to be shown; the preset picture includes a second region, the second region has the same size as a content region in a prefabricated card; and
the synthesized picture includes the first region and the second region;
a detection module, configured to, in response to that it is detected that the first region and the second region have an overlapping region, determine that the target picture is unqualified; or,
in response to that it is not detected that the first region and the second region have an overlapping region, determine that the target picture is qualified.

* * * * *